United States Patent
Komorowski

(10) Patent No.: US 7,484,903 B2
(45) Date of Patent: Feb. 3, 2009

(54) STYLUS HOLDER

(76) Inventor: Ronald A. Komorowski, 5 Thompson St., Raritan, NJ (US) 08869

( * ) Notice: Subject to any disclaimer, the term of this patent is extended or adjusted under 35 U.S.C. 154(b) by 380 days.

(21) Appl. No.: 11/204,293

(22) Filed: Aug. 15, 2005

(65) Prior Publication Data

US 2006/0039739 A1 Feb. 23, 2006

Related U.S. Application Data

(60) Provisional application No. 60/602,287, filed on Aug. 17, 2004, provisional application No. 60/649,740, filed on Feb. 2, 2005.

(51) Int. Cl.
*A46B 5/02* (2006.01)
(52) U.S. Cl. ............... 401/6; 401/48; 401/88
(58) Field of Classification Search ............ 401/6–8, 401/88, 48
See application file for complete search history.

(56) References Cited

U.S. PATENT DOCUMENTS

| | | | |
|---|---|---|---|
| 317,309 A * | 5/1885 | Cox | 401/6 |
| 336,644 A | 2/1886 | Hollwede | |
| 485,440 A | 11/1892 | Thornhill | |
| 500,564 A | 7/1893 | Dierlamm | |
| 880,510 A | 3/1908 | Delashaw | |
| 900,716 A | 10/1908 | Eubanks | |
| 926,427 A | 6/1909 | Lacy | |
| 940,744 A | 11/1909 | Smith | |
| 963,835 A | 7/1910 | Twichell | |
| 1,217,063 A | 2/1917 | Reardon et al. | |
| 1,342,576 A | 6/1920 | Wride | |
| 1,438,114 A | 12/1922 | Hume | |
| 1,603,728 A | 10/1926 | Volk | |
| 1,669,755 A | 5/1928 | Hopper | |
| 1,840,191 A | 1/1932 | Eubanks | |
| 1,971,681 A | 8/1934 | Hauton | |
| 3,947,977 A * | 4/1976 | Bishop | 401/6 |
| 4,035,865 A | 7/1977 | McRae et al. | |
| 4,037,975 A | 7/1977 | Huffman | |
| 4,283,808 A | 8/1981 | Beebe | |
| 4,821,417 A | 4/1989 | Levine | |
| 4,917,517 A | 4/1990 | Ertz | |
| 4,957,442 A | 9/1990 | Prater | |
| 5,143,463 A | 9/1992 | Pozil | |
| 5,180,239 A | 1/1993 | Bistrack | |
| 5,320,438 A | 6/1994 | Yang | |
| 5,437,399 A | 8/1995 | Levitt et al. | |
| 5,470,162 A | 11/1995 | Rubin | |
| 5,542,588 A | 8/1996 | Sison | |
| 5,626,430 A | 5/1997 | Bistrack | |
| 5,971,642 A | 10/1999 | O'Mara et al. | |
| 6,027,151 A | 2/2000 | McNab et al. | |
| 6,036,385 A * | 3/2000 | Bistrack | 401/6 |
| 6,062,753 A | 5/2000 | Hadtke et al. | |

(Continued)

*Primary Examiner*—Khoa D Hyunh
(74) *Attorney, Agent, or Firm*—Stanley H. Kremen

(57) ABSTRACT

An ergonomic device with a "boat-like" three-dimensional geometry adapted to hold an interchangeable stylus so as to reduce the stresses on hand and finger muscles when the device is used. This device greatly reduces strain and fatigue due to prolonged writing or drawing. While the device is intended primarily to aid the writing process, it is an instrument that can be used to facilitate the use of tools for sculpting, carving, surgery, etc. It may also be used by manually handicapped persons for activities such as shaving or knitting.

9 Claims, 5 Drawing Sheets

U.S. PATENT DOCUMENTS

| | | |
|---|---|---|
| 6,161,974 A | 12/2000 | Nakagawa |
| 6,203,225 B1 | 3/2001 | Baudino et al. |
| 6,250,828 B1 | 6/2001 | Liu |
| 6,254,293 B1 | 7/2001 | Citrenbaum |
| 6,315,476 B2 | 11/2001 | Nakagawa |
| 6,328,494 B1 * | 12/2001 | Moxon .......................... 401/8 |
| 6,343,885 B1 | 2/2002 | Heyne |
| 6,637,962 B1 | 10/2003 | Roche et al. |
| 6,908,245 B1 * | 6/2005 | Schulken ....................... 401/6 |
| 6,988,295 B2 * | 1/2006 | Tillim ......................... 16/430 |
| 2002/0034411 A1 * | 3/2002 | Rusk ............................ 401/6 |
| 2005/0019083 A1 * | 1/2005 | Williams et al. .............. 401/7 |
| 2006/0083575 A1 * | 4/2006 | Kim .............................. 401/6 |

* cited by examiner

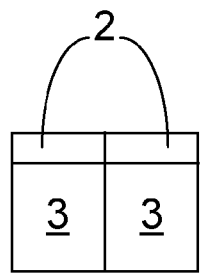
FIG 3(a)　　　　　FIG. 3(b)
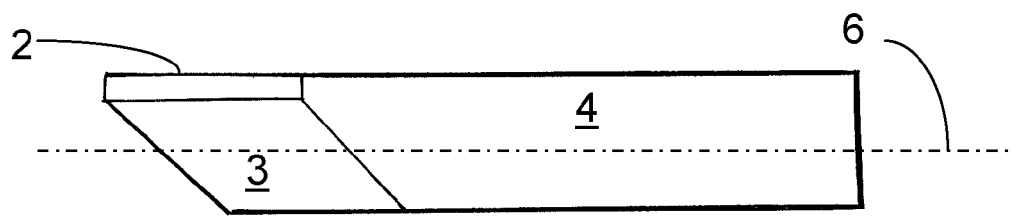
FIG. 3(c)

STYLUS HOLDER

CROSS REFERENCE TO RELATED APPLICATIONS

This application is the non-provisional counterpart of U.S. Provisional Application No. 60/602,287 filed Aug. 17, 2004 entitled "Tool For Writing etc. Instruments (Easy Write)" and of U.S. Provisional Application No. 60/649,740 filed Feb. 2, 2005 entitled "Soft Holder For Stylus." This non-provisional application claims the benefit of and priority to both said provisional applications which are incorporated by reference herein in their entirety thereto.

BACKGROUND OF THE INVENTION

Human beings are the dominant species on the planet because, unlike other potentially intelligent creatures, people are able to benefit not only from their own knowledge and experience but also from that of their contemporaries and those that lived before them. Written and printed records transmit history, ideas, and know-how from individuals to many that follow. Art also transmits concepts and emotions in the same way. Examination of early cave drawings and markings on buildings and monuments as well as ancient manuscripts allow us to trace the evolution of writing, marking, drawing, painting, carving, and engraving to what exists today. Man is uniquely able to engage in these activities because of his intelligence combined with the construction of his hands. The combination of four fingers and an opposable thumb has served him to great advantage in these activities. His specially constructed hands permit him to make and use tools. The specific tool that permits marks to be made on a writing surface is a stylus which could include (among others) a pencil, a pen, a brush, a computer stylus, etc.

Different people hold writing instruments in different ways. Most grasp a stylus between the thumb and first two fingers. However, other grasping techniques are often used. Generally, a stylus must be held so that it is immobile in a person's hand between his fingers. Gross movement of the entire hand along with fine movement of the fingers then produces the marks on the writing surface. Unfortunately, use of such an instrument for an extended period of time stresses the hand and finger muscles often producing fatigue and even pain. Writer's cramp or potentially worse physical conditions occur due to prolonged writing activity.

In addition, many people have various physical and medical problems with their hands that greatly impede their ability to write and draw. Although typewriters and computers, especially with speech-to-text software, allow these people to express their ideas on paper, their need for physical writing still exists.

Over the years, a large number of devices have been invented and sold to reduce stress in writing or to aid those who find writing difficult or even impossible. Most of these so-called ergonomic devices have not been successful in the marketplace. One notable exception is the recent inclusion of a thick, soft (elastomer based) region near the writing ends of pens or pencils. One example of this is shown in U.S. Pat. No. 6,062,753 issued to Hadtke, et. al. Another is shown in U.S. Pat. No. 1,971,681 issued to Hauton. A soft tool attachable to any writing implement that accomplishes the same purpose is shown in U.S. Pat. No. 5,143,463 issued to Pozil, et. al. Other devices include pens having large bulbous rear ends that conform to a person's palm. Some devices function as gloves with exposed writing tips while others are fastened or tied to a writer's hand or wrist. Clearly, a there is a long-felt need for some form of ergonomic device to ease the writing process.

The ability of such an ergonomic device to reduce writing stress depends entirely upon the three-dimensional geometry of the device. The teachings of all the prior art are geometry specific. To function properly, such a device would need to change the position of the fingers grasping the stylus in order to redistribute the mechanical forces on the hand and finger muscles in precisely the right way. The device would also need to fit comfortably in the hand. Ideally, when using such a device, a writer would only need his gross motor coordination, and the device would help to produce the necessary results ordinarily created from fine motor coordination. Furthermore, it should be graspable with many different hand and finger positions so as to accommodate the physical needs of multiple users.

SUMMARY OF THE INVENTION

The invention disclosed and claimed herein is an ergonomic device with a specific three-dimensional geometry that will hold any stylus so as to reduce the stresses on hand and finger muscles when the device is used. While the device is intended primarily to aid the writing process, it is an instrument that can be used to facilitate the use of tools for sculpting, carving, surgery, etc. It may also be used by manually handicapped persons for activities such as shaving or knitting.

BRIEF DESCRIPTION OF THE DRAWINGS

FIG. 1 shows isometric top views of the device.

FIG. 3 shows elevational views of the device. FIG. 3(a) represents a front elevational view. FIG. 3(b) represents a rear elevational view. FIG. 3(c) represents a side elevational view.

DETAILED DESCRIPTION OF THE INVENTION

Figure 1A:
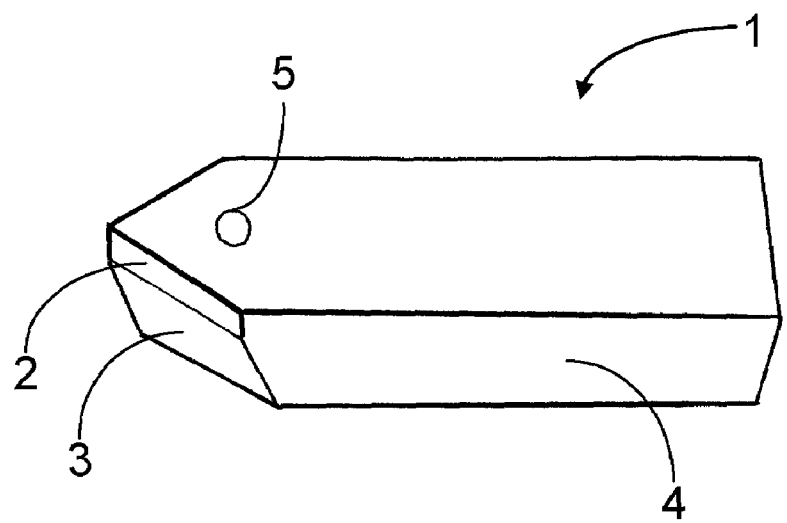
FIG. 1(a) shows the device as would be seen by an observer looking at the top of the device.

The stylus holder disclosed herein is adapted to permit its easy gripping with one, two, or more fingers of the hand, aided by the opposable digit (i.e., the thumb). It is of a scale and resiliency (preferably being made of neoprene or another elastomeric material) which makes it comfortable to be held in the human hand, as shown in the figures.

In use, the device is held by at least two fingers of the writing hand, which holds it against the palm. Further holding is enabled by the thumb of that hand. The stylus holder is adapted to receive a stylus, which may be for example a pen, pencil, brush, or simply a stylus (e.g., a "stick" used in connection with Palm Pilot, and other brands of hand-held computers or PDA's.)

When in use, aiding in writing, the device utilizes all fingers of the user's hand. This gives the user additional control, and prevents strain and fatigue which result from gripping a writing stylus without the device, e.g., by using the typical grip of a writer using a pencil—holding that pencil (the stylus) between the thumb, forefinger and index finger. The additional control a user of the device has enables the user to make neater, more fluid strokes, resulting in more pleasing work being produced by the user, and with less fatigue or discomfort.

When the device is gripped as shown, additional pressure may be incident on the stylus which the device holds. This additional pressure helps hold the stylus more securely.

Note that, in a preferred embodiment, the device comprises a block of material which, when laid horizontal, as in FIG. 1, and viewed from the top (upper) side, is largely rectangular in shape, but which at one end tapers to a point such that one end of the rectangle resembles a triangle, with the base of the triangle forming one of the two smaller sides of the rectangle. The device viewed from the bottom (under) side, as in FIG. 2, has a shape similar to that of the upper side, with the notable exception that the length of the lower side (as measured from apex of the lower triangle to the side it is opposite to) is less than the length of the upper side. This creates a slope along the side between the two pairs of triangular sides. With this slope thusly formed, the solid form of the device somewhat resembles that of a simple flat-bottomed boat, with the leading edge resembling a boat's angled bow.

The means for holding the stylus is disposed a short distance from the apex of both the upper and lower triangles (by analogy, the "bow"), and preferably is in the form of a shaft having a diameter appropriate for holding a stylus therein.

When the device is gripped by the user's hand, typically the thumb is against one of the leading (bow) sides of the triangle, and the index finger is placed against the other side, as shown in the accompanying figures. In this position, the stylus being held is proximate to the web of skin on the human hand between the thumb and forefinger, and may in fact be touching, or close to touching, that web of skin.

Figure 1B:
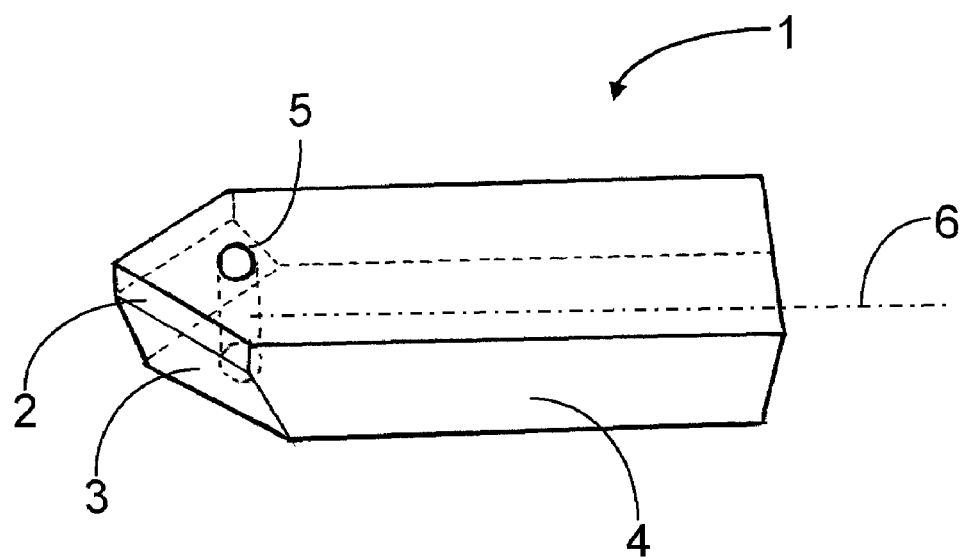
FIG. 1(b) shows the same view with hidden lines.
Figure 2A:
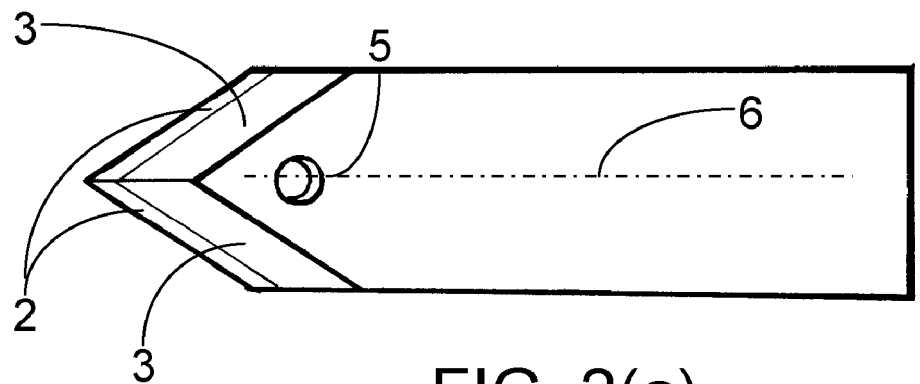
FIGS. 2(a), (b), and (c) show the bottom of the device from different viewing angles.
Figure 2B:
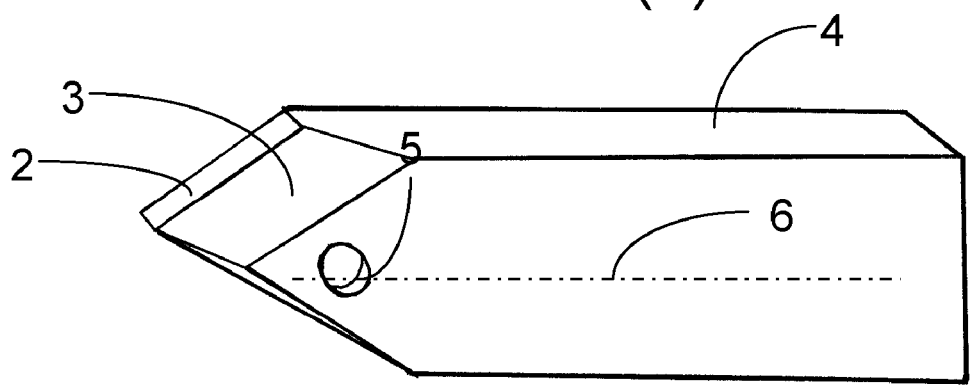
FIG. 2 shows various isometric bottom views of the device.
Figure 2C:
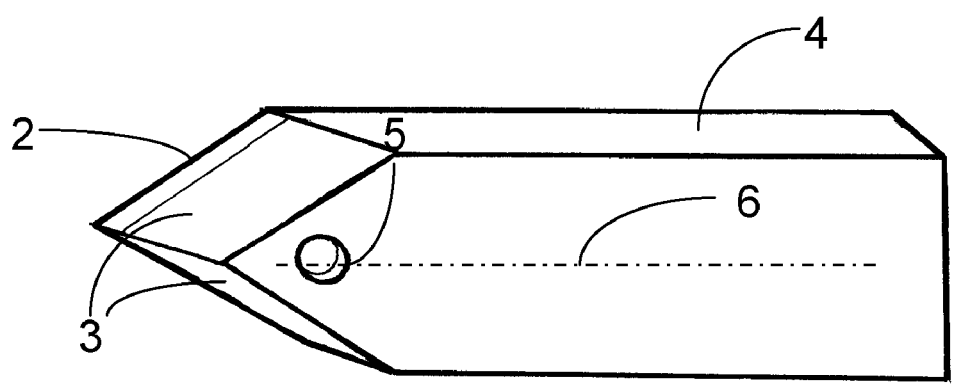

FIG. 1 shows isometric top views of the device. FIG. 1(a) shows the device as would be seen by an observer looking at the top of the device. FIG. 1(b) shows the same view with hidden lines. Referring to the figure, one can see that the topmost surface of device 1 is shaped as a rectangle and an adjacent triangle. The shape of the device is very similar to that of a boat. Therefore, references to boat structures will be used throughout this description. The front or triangular end will be referred to as the "bow." The rear end (opposed to the bow) will be referred to as the "stern." When looking toward the bow from the stern, the left-hand side of the device will be referred to as the "port side," and the right-hand side of the device will be referred to as the "starboard side." In the figure, at the bow, a small lip, 2, extends downward in a direction perpendicular to the top surface. FIG. 1(b) shows that this lip extends on both exposed sides of the triangular bow. From this lip, tapered surfaces, 3, extend downward to the bottom surface. Also shown in FIG. 1(b) is an imaginary line (or axis) passing through the device in a longitudinal direction essentially parallel to the bottom surface. A hole 5, at the bow end, for insertion of the stylus, extends through the device from the top surface to the bottom surface. In the drawing, longitudinal axis of the essentially cylindrical hole 5 is substantially perpendicular to axis 6. Precise perpendicularity is not required. What is required for proper operation of the device is that the one opening of the hole be on the bottom surface. Therefore, the hole 5 cannot be parallel to axis 6. From FIG. 2, is apparent that this construction renders the bottom bow area smaller than the top bow area. In the figures, the port side is labeled as 4. The hole, 5, at the bow end, is shown extending through the device from the top surface to the bottom surface. Note that axis 6 is shown essentially perpendicular to the cylindrical axis of hole 5. FIGS. 2(a), (b), and (c) show isometric views of the bottom of the device from various viewing angles. FIG. 3(a) shows a front elevational view of the device. This view looks at the device directly toward the bow. FIG. 3(b) shows a rear elevational view of the device. This view looks at the device directly toward the stern. FIG. 3(c) shows a side elevational view of the device. This view looks at the device directly toward the port side. However, the port and starboard sides are symmetrical.

In the figures, the port and starboard surfaces are perpendicular to the top ("deck") and bottom surfaces. However, it may be convenient to taper these surfaces as well. In that case, FIG. 3(b) would appear roughly as a trapezoid with the bottom base being smaller than the top base (or "deck").

Figure 4:
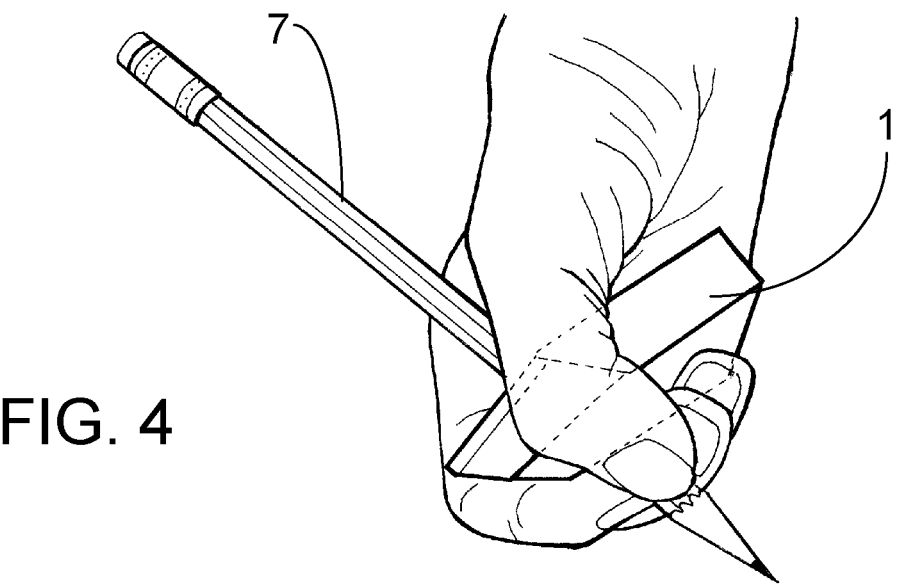
FIG. 4 is an isometric view showing how a user might normally grasp the device equipped with a stylus.
Figure 5:
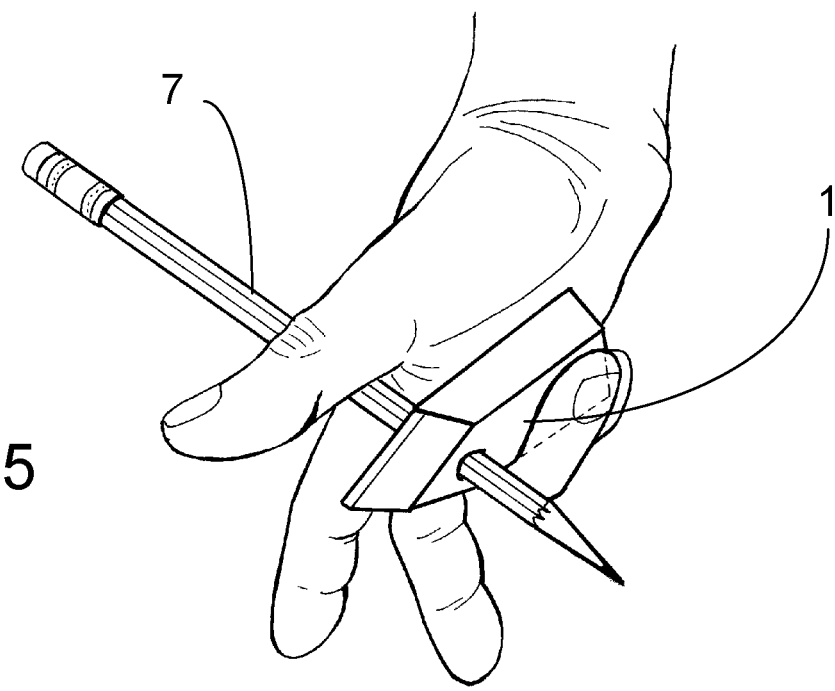
FIG. 5 is an isometric view showing an alternate technique for grasping.

FIG. 4 is an isometric view showing how most people would grasp the device. In this instance, the stylus 7 is illustrated as a conventional pencil. However, many different grasping positions are possible, and would be found convenient by different users. For example, a user could wrap his entire hand around the device holding it with all five fingers in his fist. The user would then only need to move is hand and wrist to write. Another grasping position is shown in FIG. 5 where the stylus 7 is positioned against the web between the thumb and forefinger and the device is held by either one or two other fingers. In this position, a person who is missing several fingers may still be able to write. Clearly, stylus 7 need not only be a pencil, but can be any device used for writing, painting, or marking.

Experiments have shown that the device disclosed herein actually makes writing easier. People who have tried the device experimentally found that they were able to write for much longer periods of time. Furthermore, when drawing or painting instruments such as brushes or markers, rather than pens or pencils, are inserted into the device, the user can make artistic strokes that were heretofore impossible. The device has also proven successful using interchangeable erasers inserted therein.

The device may be used not only to hold writing and drawing implements, but may also be used to hold (inter alia) forks and spoons, soldering irons, dentist tools, sculpting tools (for clay), Exacto knives, and surgical instruments. It may also hold a razor to be used for shaving. It may also hold and facilitate the use of knitting needles.

Figure 6:
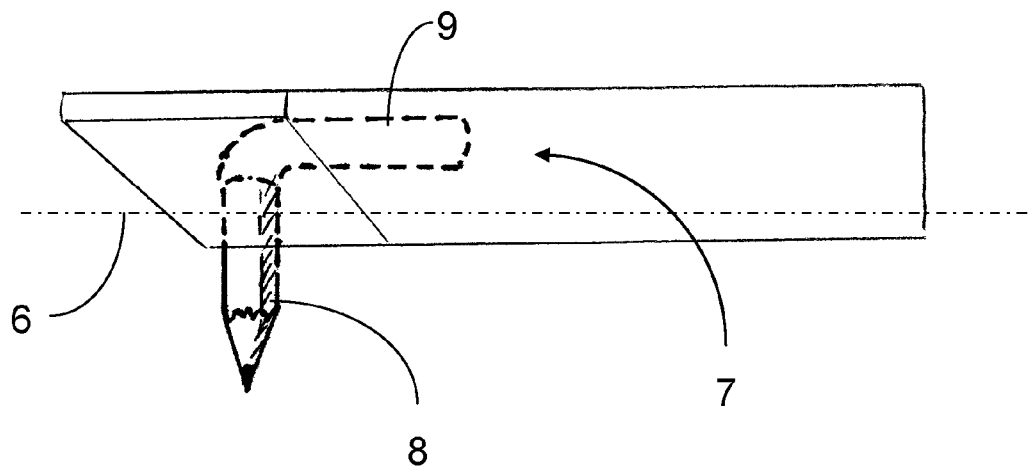
FIG. 6 is a left (or port) side elevational view of the device into which there is a permanently embedded L-shaped stylus.
Figure 7:
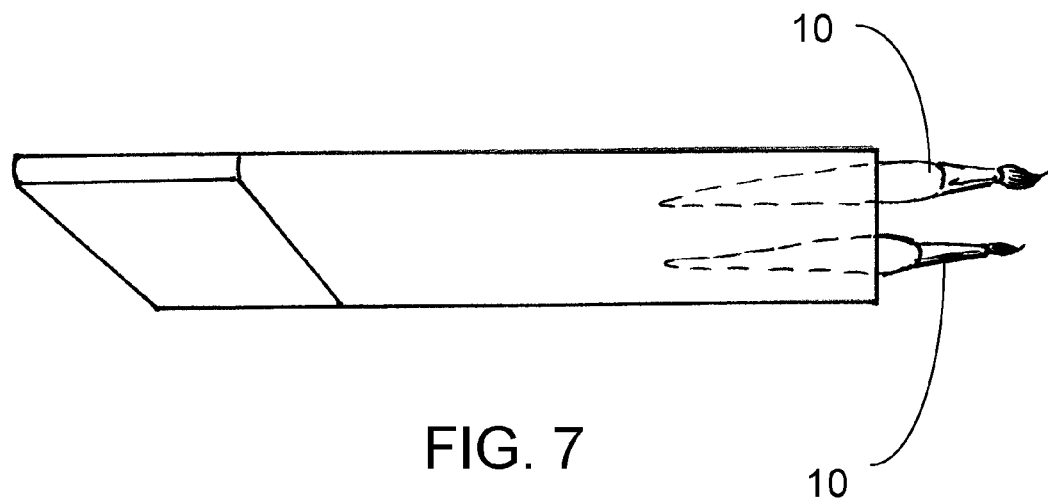
FIG. 7 is a left (or port) side elevational view of the device having receptacles containing accessories.

The writing implement may also be much shorter than current pens or pencils. Long sticks have been used for writing over the years for ergonomic reasons. This is no longer necessary. The writing implement may also be L-shaped, with an end embedded into the device itself. In that event, there would be no hole in the top surface, and the writing end of the stylus would extend only out from the bottom surface. This is shown in FIG. 6. Stylus 7 is L-shaped and permanently embedded in the device. The drawing shows that portion 8 of stylus 7 protrudes from the bottom surface in a direction essentially perpendicular to the bottom surface and to longitudinal axis 6 while portion 9 of stylus 7 is embedded inside the device in a direction essentially parallel to the bottom surface and longitudinal axis 6. In addition, the device may also be configured with receptacles to permit storage of different writing instruments, parts of writing instruments (e.g., pen points, pencil leads, erasers) or Exacto knife or razor blades. This is shown in FIG. 7.

GLOSSARY

Throughout this patent application the Applicant is referring to his invention being shaped like a boat. This necessitated the use of nautical terms to describe the device. However, although the device has a boat-like shape, it is not a boat. It is not essentially hollow, and its purpose is not to float in water. Therefore, in using nautical descriptions, the Applicant becomes his own lexicographer. The terms as used herein supersede their plain and ordinary meanings.

BOW—The triangular-shaped end of the device (i.e., the front end).
STERN—The surface opposite the bow (i.e., the rear end).
STARBOARD—the right side of the device looking forward toward to bow.
PORT—the left side of the device looking toward the bow.
DECK—the top surface of the device. When observing the deck from a top elevational view looking toward the bow, the port face 4 is on the left side.
BOTTOM SURFACE—the surface opposite the deck.

I claim the following:

1. A stylus holder designed in a shape of a boat and sized to generally fit in a person's hand and to be held in a fixed position proximate to the palm of the hand, said stylus holder comprising a longitudinal axis, a bow, a stern, a top surface proximate to the palm, an opposite bottom surface, and a hole comprising an opening through which a stylus or other stick-like instrument extends through said stylus holder from said top surface to said opposite bottom surface, wherein:

a) said hole is located at said bow,
b) said hole extends through said stylus holder from said top surface to said opening which is located on the bottom surface; and
c) the stylus extends from said hole and through said opening such that said stylus protruding beyond said opposite bottom surface in a direction substantially perpendicular to the bottom surface and said longitudinal axis.

2. The holder of claim 1 wherein the top and bottom surfaces each further comprise a surface area, such that the surface area of said bottom surface is smaller than the surface area of said top surface.

3. The holder of claim 2 wherein each of the top and bottom surfaces is formed as a triangle adjacent to a rectangle.

4. The holder of claim 3 wherein the area of the triangle of the bottom surface is smaller than the area of the triangle of the top surface.

5. The holder of claim 4 wherein the area of the rectangle of the bottom surface is smaller than the area of the rectangle of the top surface.

6. The holder of claim 1 wherein the hole extends through the holder thereby permitting the stylus or other stick-like instrument to be inserted into the holder by a user.

7. The holder of claim 1 wherein part of the stylus or other stick-like instrument is permanently embedded in the holder.

8. The holder of claim 7 wherein the stylus or other stick-like instrument is L-shaped.

9. The holder of claim 1 further comprising receptacles to contain accessories as required by a user.

* * * * *